Dec. 3, 1957  A. C. FORTUNSKI  2,815,217
COLLETS
Filed Oct. 4, 1954

INVENTOR.
Antony C. Fortunski
BY
Gerald R. Baldwin
Attorney

United States Patent Office 2,815,217
Patented Dec. 3, 1957

2,815,217
COLLETS
Anthony C. Fortunski, Hamtramck, Mich.
Application October 4, 1954, Serial No. 459,892
4 Claims. (Cl. 279—51)

This invention relates to improvements in collets for supporting and gripping stock to be machined in lathes, automatic machines and the like. It is customary for manufacturers to make such collets in a range of sizes to grip circular stock of say 7/8", 15/16", 1" and so on. However the practice of calling for the use of non-standard sizes of stock is rapidly increasing. For instance stock .990" in diameter is too small to be held in a 1" collet and too large to be inserted in a 15/16" one. For relatively short runs, which are often needed particularly when work has been turned over to a subcontractor, it is not feasible to wait for delivery of special sized collets, and it is very difficult to grind out the bore of a hardened and finished collet the jaws of which are segmental and split from one another from the front, as that involves the retention of the outer ends of the segmental jaws in their relative concentric positions during the operation. Though efforts are often made to shim the jaws apart and to solder them relative to one another for re-grinding the result thus obtained is frequently unsatisfactory.

It is an object of the invention to provide a collet which includes readily insertable, or removable, means for holding the jaws truly concentric after the collet is finished and hardened, so that the jaws may be securely retained in their correct relative positions while the bore of the collet is bored out as with a diamond tool or ground out to a larger size.

Another object of the invention is to provide such a collet wherein the means for retaining and supporting the jaws concentrically is such that its inclusion does not materially increases the cost of producing the collet.

A further object of the invention is to provide a method of securely and concentrically holding the split jaws of a collet during the re-boring or re-grinding of its bore.

Figure 2:
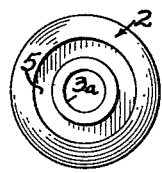
Figure 1:
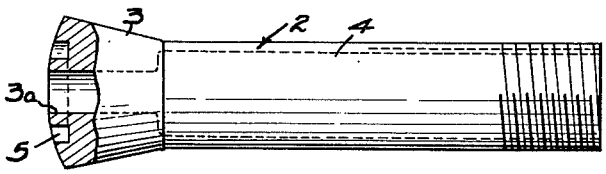
Figure 3:
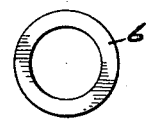
Figure 6:
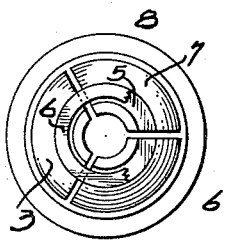
Figure 5:
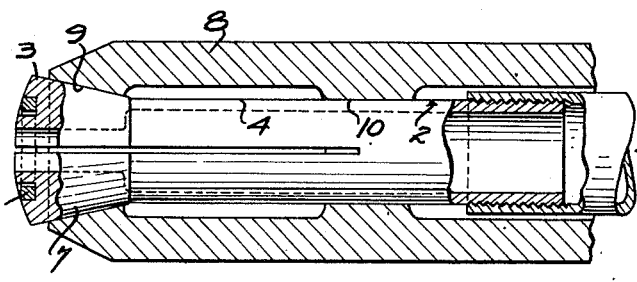
Figure 4:
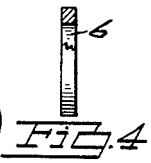
Figure 7:
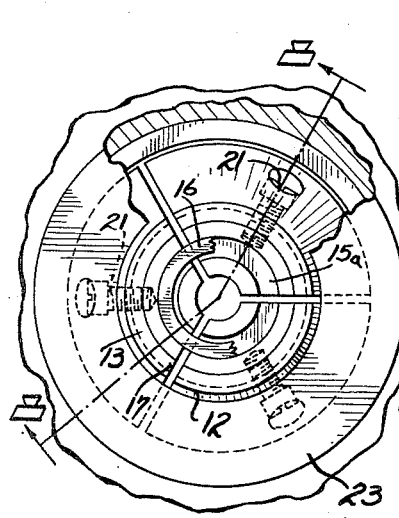
Figure 8:
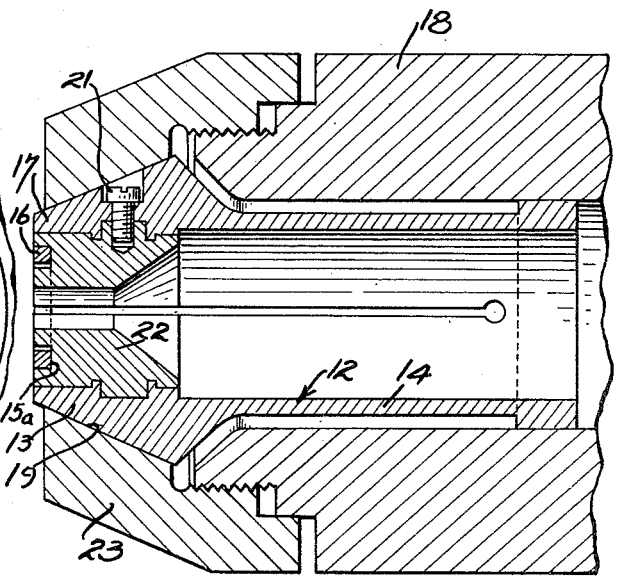
Figure 9:
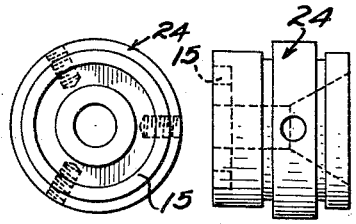

Having thus briefly and broadly stated some of the objects and advantages of the invention I will now describe it with the aid of the accompanying drawing, in which:

Figure 1 shows a side view of a partly finished collet and
Figure 2 is a front view thereof.
Figure 3 is a front view of a retaining ring, and
Figure 4 is a side view thereof.
Figure 5 is a side view showing the finished collet mounted in a conventional collet tube and having the removable retaining ring in engagement with its segments or jaws.
Figure 6 is a front view of Figure 5.
Figure 7 shows a slight modification of the invention including another form of conventional collet having inner segments or pads mounted in the outer segments, and a removable retaining ring mounted in arcuate grooves formed in the inner segments.
Figure 8 is a section on the line 8—8 of Figure 7.
Figure 9 is a front view of an annular member shown in Figures 7 and 8 and its retaining ring groove, prior to being split to form the inner segments.

Figure 10:
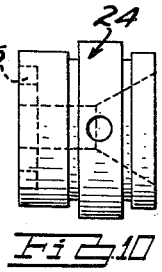
Figure 11:
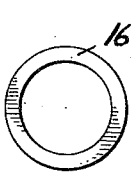
Figure 12:

Figure 10 is a side view of Figure 9.
Figures 11 and 12 are front end and side views, respectively, of the retaining ring used in Figures 7 and 8.

Referring particularly to Figures 1 and 2, 2 denotes a collet tubular throughout its length, the manufacture of which has not been completed. The collet consists of a head 3 extending from the front for a portion of its length and terminating in a coaxial body 4. The head is of greater diameter than the body and its outer periphery is inwardly tapered from its front extremity. The bore 3a of the head is smaller than that of the body 4 so that the former may grip stock (when the manufacture of the collet is completed) while the said stock—not shown—is freely slidable through the bore of the body. Formed in the front face of the head 3 is an annular groove 5 coaxial with the bore of the head and body to receive a removable ring 6, shown in Figures 3 and 4.

Subsequent to the formation of the annular groove 5 therein the head 3 and the front portion of the body 4 are radially split into a plurality of segments 7, shown in Figures 5 and 6, which constitute gripping jaws. The collet is then hardened. The collet head 3 and body 4 are then mounted in a collet tube 8 the front portion of which is provided with a tapered bore 9 to coact with the outer peripheral faces of the segments 7 formed by the radially split portions of the head 3. Thus when the head 3 and body 4 are moved inwardly relative to the collet tube 8 the segments are forced toward the axis of the collet tube. The body 4 is usually supported for axial movement intermediately of its length in a bearing 10 in the tube 8.

If it is desired to bore out, as with a diamond tool, or grind out the bore of the segments 7 after the tool has been completed and hardened in order to use it for gripping stock of larger diameter than that for which it was originally made, the collet including both the body 4 and the tube 8 are mounted in position on the machine on which the tool is to be employed. The ring 6 is inserted in the arcuate portions of the groove 5 which extend across the segments 7 and then the body and collet tube are relatively so moved that sufficient inward pressure is exerted upon the segments to cause the outer faces of the arcuate portions of the groove 5 to bear against the outer peripheral face of the ring 6. The segments 7 are then so supported that they are held concentric with the body 3. Moreover after the re-boring or re-grinding operation has been completed the bore 3a is absolutely true, because any errors in the concentricity of the machine spindle or its component parts, or in the collet, which may have previously existed, have been cancelled out so that concentricity of work held by the re-bored or re-ground collet must result. It will be noted that the outer peripheral wall of the ring 6 is the same diameter as that of the outer face of the groove 5 before the head 3 is split into its segments 7, thereby insuring that when the ring is in place the segments are truly concentric; and in order to facilitate removal of the ring 6 the diameter of its inner peripheral wall is made somewhat greater than the inside diameter of the groove 5.

Figures 7 and 8 show a modified form of collet including a tubular head 13 extending from the inner extremity of which is a coaxial body 14, which is also tubular. The head 13 and the adjacent portion of the body 14 are split radially thereby dividing the head into a plurality of outer segments 17; and secured as by screws 21 to the inner faces of the said outer segments are inner segments or pads 22 which are so placed that the radial slots between the inner and outer segments coincide.

Formed in the outer faces of the inner segments are arcuate grooves 15a adapted to receive a removable ring 16 by which the said inner segments, and the outer segments 17 to which they are secured, may be held coaxial with the body 14. The collet 12 is mounted in a collet tube 18 in which it is supported for axial movement. The outer periphery of the head 13, that is of the segments 17, is outwardly tapered from its outer extremity to coact with the correspondingly tapered face 19 of a nut 23 in threaded engagement with the tube 18, so that as the said nut is tightened the outer and inner segments 17 and 22 are forced inwardly.

Figures 9 and 10 show an annular member 24 which is subsequently radially split (either prior or subsequent to its attachment to the head 13) to form the inner segments 22, and to bring out that prior to being radially split an annular groove 15 is formed therein which, after the splitting of the said member, forms the arcuate grooves 15a. Again the outer peripheral face of the groove 15 is made the same diameter as the outer diameter of the ring 16, while the inner diameter of the latter is somewhat greater than that of the inner peripheral face of the groove 15. In this way when the nut 23 is tightened the segments 17 and 22 are forced inward until the bore of the inner segments is concentric with that of the body 14; and by making the ring narrower than the groove removal of the former from the latter is rendered easier when the nut 23 is loosened.

While in the foregoing the preferred embodiments of the invention have been described and shown, it is understood that alterations and modifications may be made thereto provided the said alterations and modifications fall within the scope of the appended claims.

What I claim is:

1. In a device for supporting a collet for reboring, a collet tube having an internally tapered outer end and adapted to accommodate a tubular collet body therein, a collet head formed on one end of said body and having a bore extending therethrough and coaxial with the bore of said body, said head being outwardly flared to interengage the tapered end of said collet tube, said head and the adjacent portion of said body being split into a plurality of segments, the outer extremity of said head having an annular groove formed therein, and a removable ring adapted to be inserted in said groove for retaining said segments concentric with said body whereby said collet head bore may be rebored.

2. In a device for supporting a collet for reboring, a collet tube having an internally tapered outer end and adapted to accommodate a tubular collet body therein, a collet head formed on one end of said body and having a bore extending therethrough and coaxial with the bore of said body, said head being outwardly flared to interengage the tapered end of said collet tube, said head and the adjacent portion of said body being split into a plurality of segments, the outer extremity of said head having an annular groove formed therein between the bore and annulus thereof, and a continuous removable ring adapted to be inserted in said groove for retaining said segments concentric with said body whereby said collet head bore may be rebored.

3. In a device for supporting a collet for reboring, a tubular collet tube, a nut adjustably mounted on one end of said tube, said nut being internally tapered, said tube adapted to accommodate a tubular collet body therein, a collet head formed on one end of said body, said head being flared to interengage said tapered nut, said head having outer segmental portions, inner segmental portions secured to said outer segmental portions, said inner segmental portions defining a bore coaxial with the bore of said collet body, an annular groove being formed in said inner segmental portions, and a removable ring adapted to be inserted in said groove for retaining said segments and said head concentric with said body whereby said collet head bore may be rebored.

4. In a device for supporting a collet for reboring, a tubular collet tube, a nut adjustably mounted on one end of said tube, said nut being internally tapered, said tube adapted to accommodate a tubular collet body therein, a collet head formed on one end of said body, said head being flared to interengage said tapered nut, said head having outer segmental portions, inner segmental portions secured to said outer segmental portions, said inner segmental portions defining a bore coaxial with the bore of said collet body, an annular groove being formed in the end faces of said inner segmental portions, and a continuous removable ring adapted to be inserted in said groove for retaining said segments and said head concentric with said body whereby said collet head bore may be rebored.

References Cited in the file of this patent

UNITED STATES PATENTS

| | | |
|---|---|---|
| 978,055 | Owens | Dec. 6, 1910 |
| 1,898,264 | Proefke | Feb. 21, 1933 |
| 2,389,633 | Odom et al. | Nov. 27, 1945 |